United States Patent
Evans et al.

(10) Patent No.: US 12,515,819 B2
(45) Date of Patent: Jan. 6, 2026

(54) LARGE-SCALE CUBESAT CHASSIS

(71) Applicant: Government of the United States as represented by the Secretary of the Air Force, Wright-Patterson AFB, OH (US)

(72) Inventors: Matthew D. Evans, Pollock, ID (US); Robert A. Bettinger, Oakwood, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 19/024,606

(22) Filed: Jan. 16, 2025

(65) Prior Publication Data

US 2025/0319994 A1    Oct. 16, 2025

Related U.S. Application Data

(60) Provisional application No. 63/632,250, filed on Apr. 10, 2024.

(51) Int. Cl.
*B64G 1/22* (2006.01)
*B64G 1/10* (2006.01)

(52) U.S. Cl.
CPC ............. *B64G 1/223* (2023.08); *B64G 1/10* (2013.01); *B64G 1/22* (2013.01)

(58) Field of Classification Search
CPC .................................................... B64G 1/223
See application file for complete search history.

(56) References Cited

U.S. PATENT DOCUMENTS 9,248,924 B2   2/2016  Puig-Suari et al.
10,538,341 B1*  1/2020  Fraze ..................... B64G 1/10
(Continued)

FOREIGN PATENT DOCUMENTS

WO     2018115180 A1    6/2018

OTHER PUBLICATIONS

Areda et al. 2002. "Development of Innovative CubeSat Platform for Mass Production" Applied Sciences 12, No. 18: 9087. https://doi.org/10.3390/app12189087 (Year: 2022).*
(Continued)

*Primary Examiner* — Richard Green
(74) *Attorney, Agent, or Firm* — AFMCLO/JAZ; Richard M. Mescher (57) ABSTRACT

The present invention relates to large-scale CubeSat chassis and methods of making and using same. The disclosed CubeSat comprises specific structural features that can yield up to at least a 27 U CubeSat that has comparable or even better performance and benefits than that of smaller Cube-Sats. Such volume increase coupled with the structural integrity of Applicants' CubeSats opens up a wide range of CubeSat performance increases including, but not limited to, larger payloads, more diverse payloads and larger CubeSat fuel capacities. Such increased payload capabilities includes, for example, increased focal length capabilities and such improved maneuverability results in, for example, decreased ground sample distance, increased optical resolution, increased ability to change orbits, increased structural stability. In addition, the judicious selection of such specific structural features can result increased payload capabilities and improved maneuverability.

14 Claims, 8 Drawing Sheets

(56) References Cited

U.S. PATENT DOCUMENTS 10,696,430 B2 * 6/2020 Bose .................. B64G 1/10
11,005,165 B2 * 5/2021 Romano ............... B64G 1/443

OTHER PUBLICATIONS

Areda et al. 2002. "Development Innovative CubeSat Platform for Mass Production" Applied Sciences 12, No. 18: 9087. https://doi.org/10.3390/app12189087 (Year: 2002).*
Allam et al. 2020. "A Step-Change in CubeSat Architecture: Moving from Stacked to Slotted Design" Proceedings of the Small Satellite Conference, SSC20-P4-25. https://digitalcommons.usu.edu/smallsat/2020/all2020/249/. (Year: 2020).*

* cited by examiner

LARGE-SCALE CUBESAT CHASSIS

CROSS-REFERENCE TO RELATED APPLICATIONS

The present application claims priority to U.S. Provisional Application Ser. No. 63/632,250 filed Apr. 10, 2024, the contents of such provisional application hereby being incorporated by reference in its entry.

RIGHTS OF THE GOVERNMENT

The invention described herein may be manufactured and used by or for the Government of the United States for all governmental purposes without the payment of any royalty.

FIELD OF THE INVENTION

The present invention relates to large-scale CubeSat chassis and methods of making and using same.

BACKGROUND OF THE INVENTION

The CubeSat platform is a type of satellite which is characterized by the satellite's volume in terms of units (U). A single unit, referred to as 1 U, has the standard dimensions of: 10 cm wide, 10 cm depth, and 10 cm height. The demand for greater onboard capabilities has led to the ever-increasing dimensions of the CubeSat. However, the largest CubeSats to have ever launched are only 16 U. What is desired is a 27 U CubeSat that meets the structural load requirements under the NASA General Environmental Verification Standard (GEVS) and that can be used low Earth orbit, as well as the cislunar and lunar domains.

Applicants recognized that the source of the aforementioned problem was that as a CubeSat's volume increases, the structural integrity of such CubeSat greatly decreases. Applicants recognized that if specific structural features were added to a CubeSat design, the resulting CubeSat's volume could be increased to yield at least a 27 U CubeSat that would have comparable or even better performance and benefits than that of smaller CubeSats. Such volume increase coupled with the structural integrity of Applicants' CubeSats opens up a wide range of CubeSat performance increases including, but not limited to, larger payloads, more diverse payloads and larger CubeSat fuel capacities. Such increased payload capabilities includes, for example, increased focal length capabilities and such improved maneuverability results in, for example, decreased ground sample distance, increased optical resolution, increased ability to change orbits, increased structural stability. In addition, the judicious selection of such specific structural features can result increased payload capabilities and improved maneuverability.

SUMMARY OF THE INVENTION

The present invention relates to large-scale CubeSat chassis and methods of making and using same. The disclosed CubeSat comprises specific structural features that can yield up to at least a 27 U CubeSat that has comparable or even better performance and benefits than that of smaller CubeSats. Such volume increase coupled with the structural integrity of Applicants' CubeSats opens up a wide range of CubeSat performance increases including, but not limited to, larger payloads, more diverse payloads and larger CubeSat fuel capacities. Such increased payload capabilities includes, for example, increased focal length capabilities and such improved maneuverability results in, for example, decreased ground sample distance, increased optical resolution, increased ability to change orbits, increased structural stability. In addition, the judicious selection of such specific structural features can result increased payload capabilities and improved maneuverability.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

DETAILED DESCRIPTION OF THE INVENTION

Definitions

Unless specifically stated otherwise, as used herein, the terms "a", "an" and "the" mean "at least one".

As used herein, the terms "include", "includes" and "including" are meant to be non-limiting.

As used herein, the words "about," "approximately," or the like, when accompanying a numerical value, are to be construed as indicating a deviation as would be appreciated by one of ordinary skill in the art to operate satisfactorily for an intended purpose.

As used herein, the words "and/or" means, when referring to embodiments (for example an embodiment having elements A and/or B) that the embodiment may have element A alone, element B alone, or elements A and B taken together.

The term "joined", as used herein, encompasses configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e., one element is essentially part of the other element. The term "joined" includes both those configurations in which an element is temporarily joined to another element, or in which an element is permanently joined to another element.

The terms "top", "bottom", "front", "back", "left", "right", "sides", "horizontal", and "vertical" refer to the orientation of the CubeSat when it is oriented as shown in the drawings. It is understood that these descriptions are not limiting, and that the CubeSat may be placed in other orientations.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

DETAILED DESCRIPTION OF THE DRAWINGS

Figure 1:
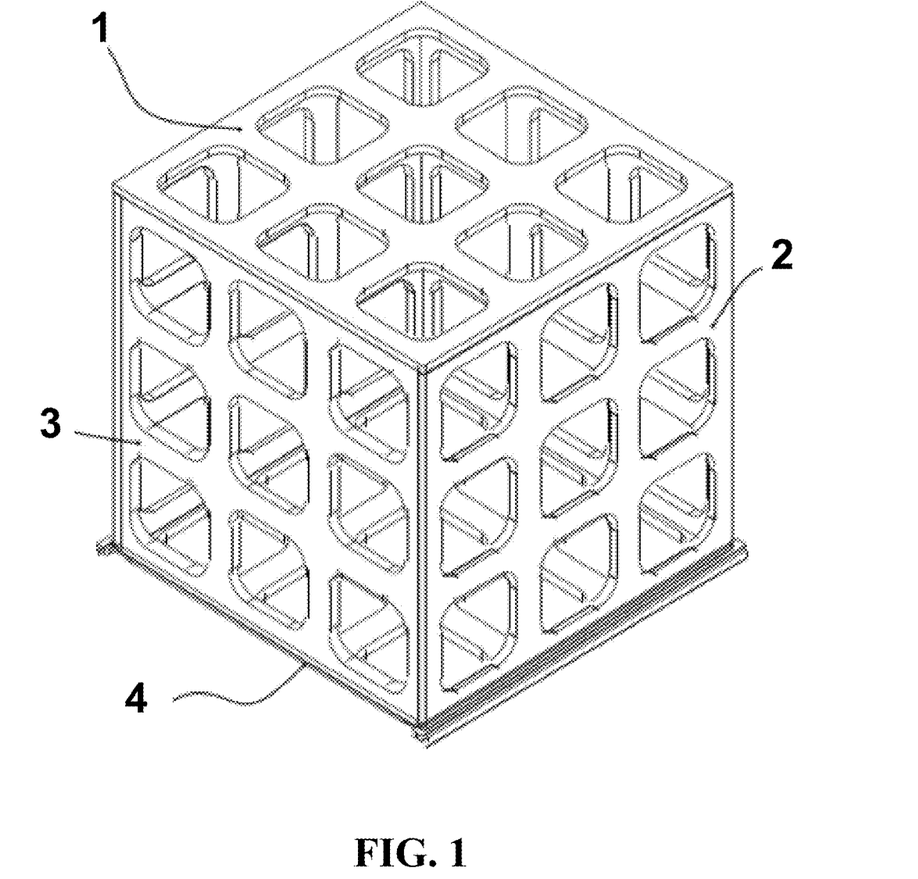
FIG. 1 depicts the large-scale CubeSat chassis with all external structural plates fastened together.

FIG. 1 depicts the large-scale CubeSat Chassis with all external structural plates fastened together. Identified are the top plate (1), the right plate (2), back plate (3), and bottom plate (4). The CubeSat Chassis is shown in a Cartesian coordinate system with X, Y, and Z axes, that will be used to specify the location and orientation of various components of the chassis described herein.

Figure 2:
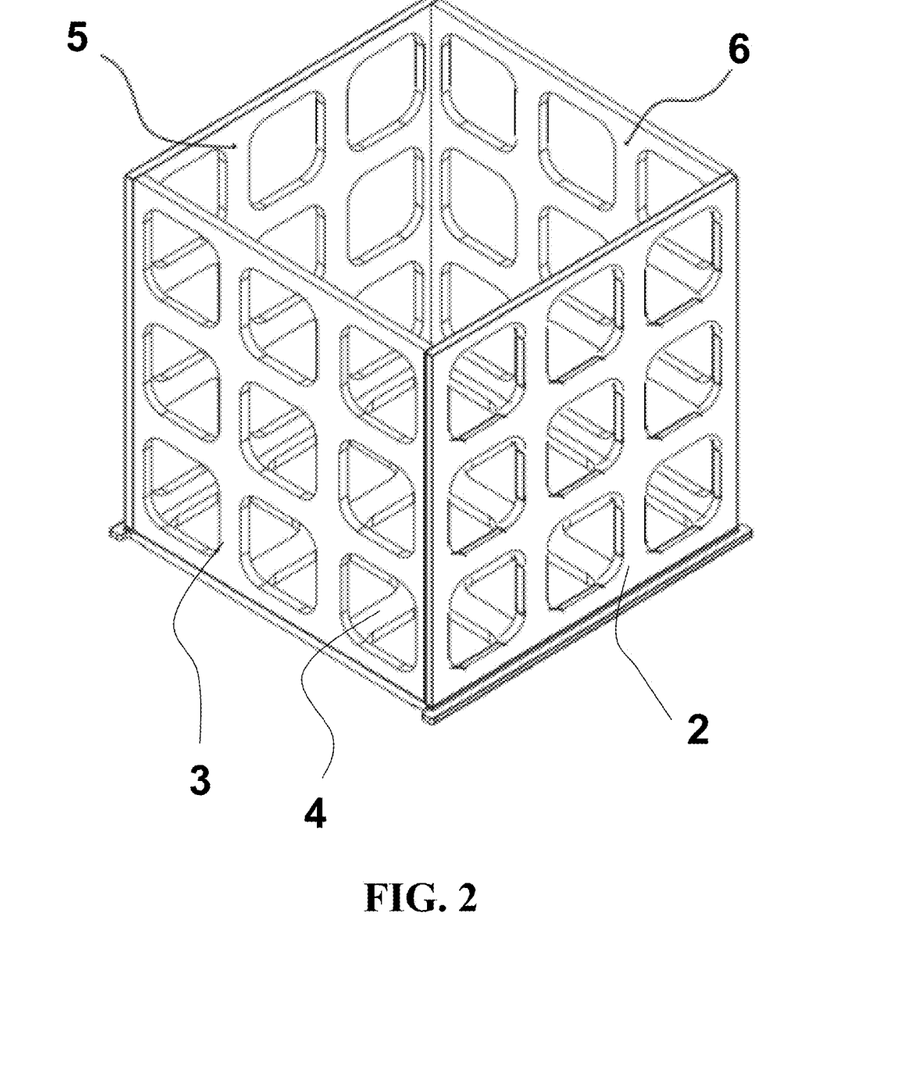
FIG. 2 depicts the large-scale CubeSat chassis with the top structural plate removed to show the internal chassis volume.

FIG. 2 depicts the large-scale CubeSat Chassis with the top structural plate (1) removed to show the internal chassis volume and the left plate (5) and front plate (6).

Figure 3:
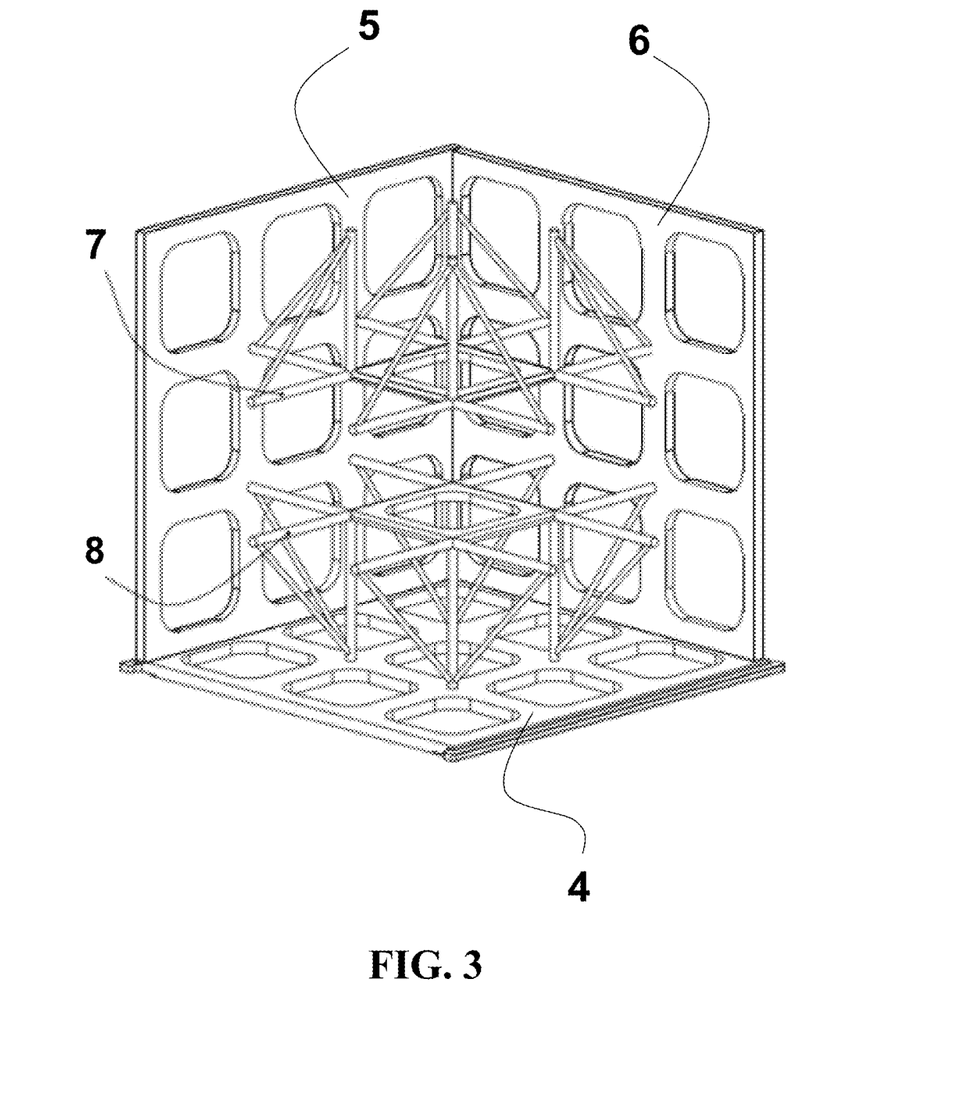
FIG. 3 depicts the internal volume layout of the large-scale CubeSat Chassis with the internal truss structure.

FIG. 3 depicts the internal volume layout of the large-scale CubeSat Chassis with the upper internal truss (7) providing internal support to the top-half of the chassis, and the lower internal truss (8) providing internal support to the lower-half of the chassis.

Figure 4:
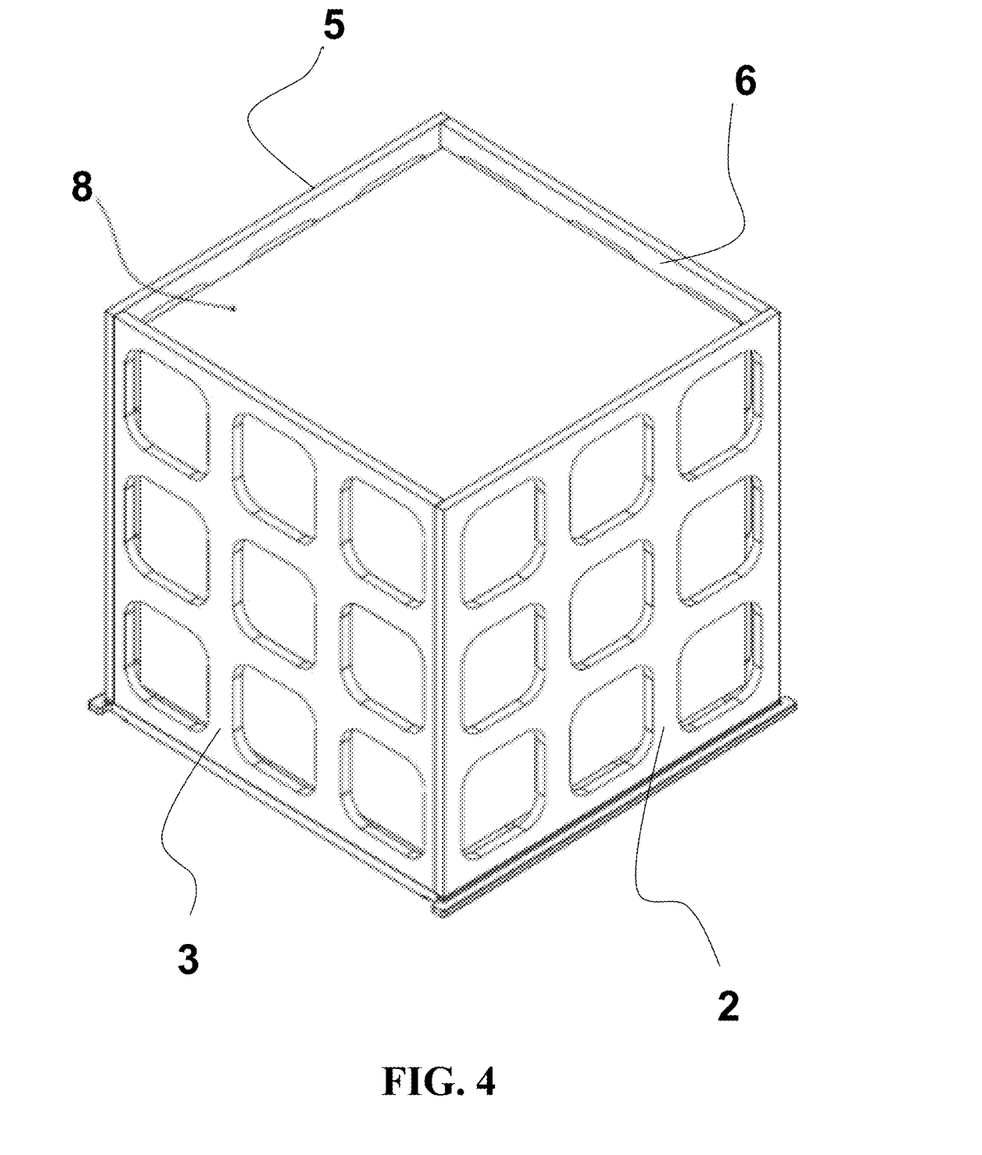
FIG. 4 depicts the large-scale CubeSat chassis with a notional single 27 U (or, 27-liter) CubeSat subsystem filling the entire internal volume of the large-scale CubeSat Chassis.

FIG. 4 depicts the large-scale CubeSat Chassis with a notional single 27 U (or, 27-liter) CubeSat subsystem (8) filling the entire internal volume of the large-scale CubeSat Chassis. The large-scale CubeSat Chassis enables full modularity of the internal volume with the chassis being able to host a single internal unit comprising all necessary CubeSat subsystem and payload functionality.

Figure 5:
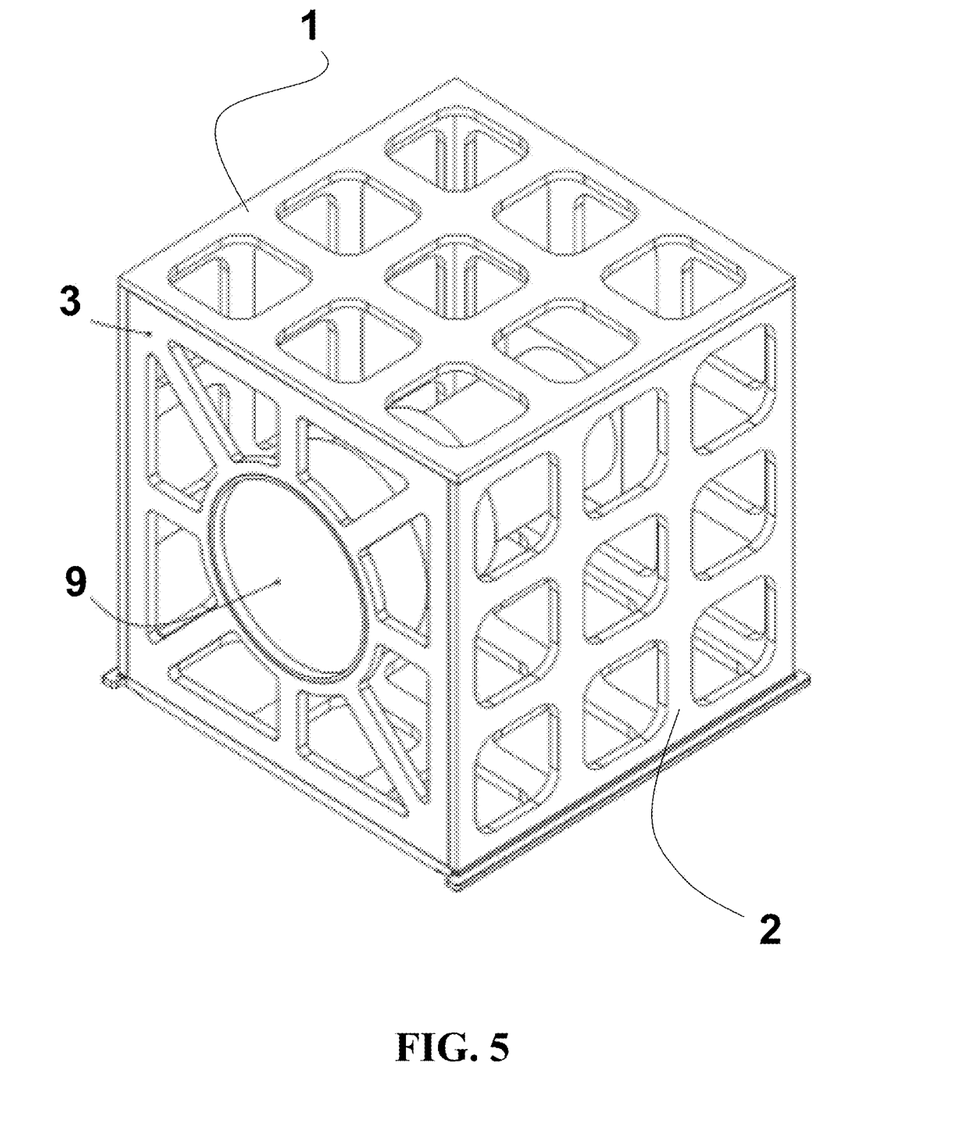
FIG. 5 depicts the large-scale CubeSat chassis with a notional optical payload.

FIG. 5 depicts the large-scale CubeSat Chassis with the left back plate (3) modified to host a notional optical payload (9) oriented in the center of-left back plate (3) and extending into the center of the CubeSat chassis.

Figure 6:
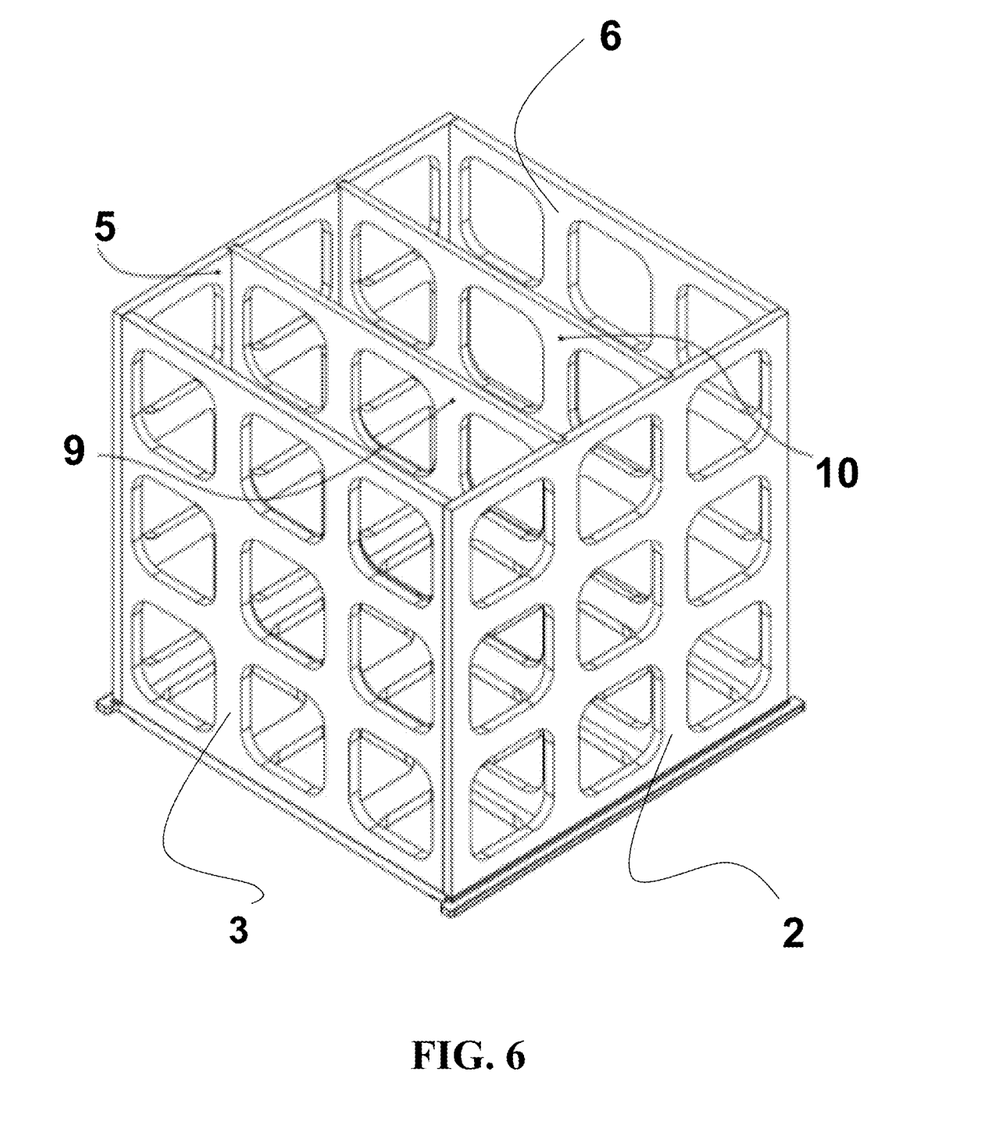
FIG. 6 depicts the large-scale CubeSat chassis with the top structural plate removed to show two internal partitions contained within the internal volume.

FIG. 6 depicts the large-scale CubeSat Chassis with the top structural plate removed to show the left plate (5) with machined vertical grooves to support the placement of two internal partitions (9, 10) contained within the internal volume.

Figure 7:
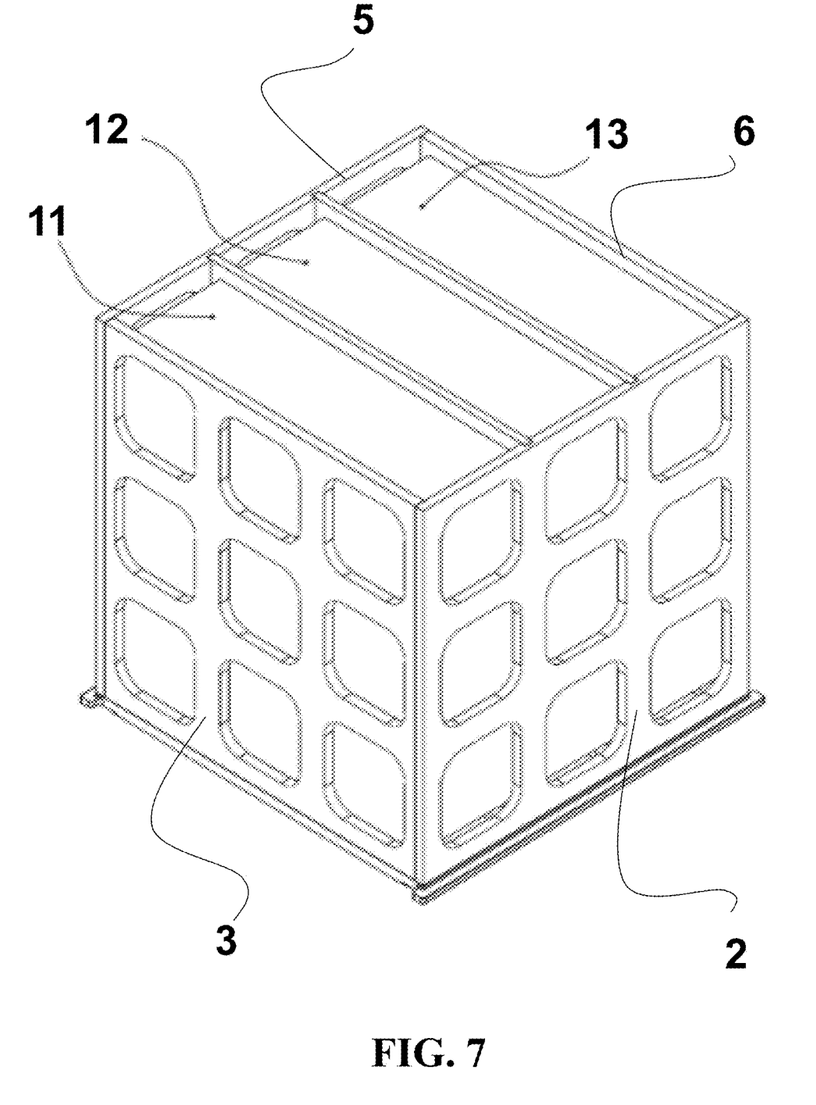
FIG. 7 depicts the large-scale CubeSat chassis with the top structural plate removed to show two internal partitions and three notional subsystems filling the internal volume.

FIG. 7 depicts the large-scale CubeSat Chassis with the top structural plate removed to show two internal partitions and three 1U×3U×3U notional subsystems (11, 12, 13) filling the internal volume.

Figure 8:
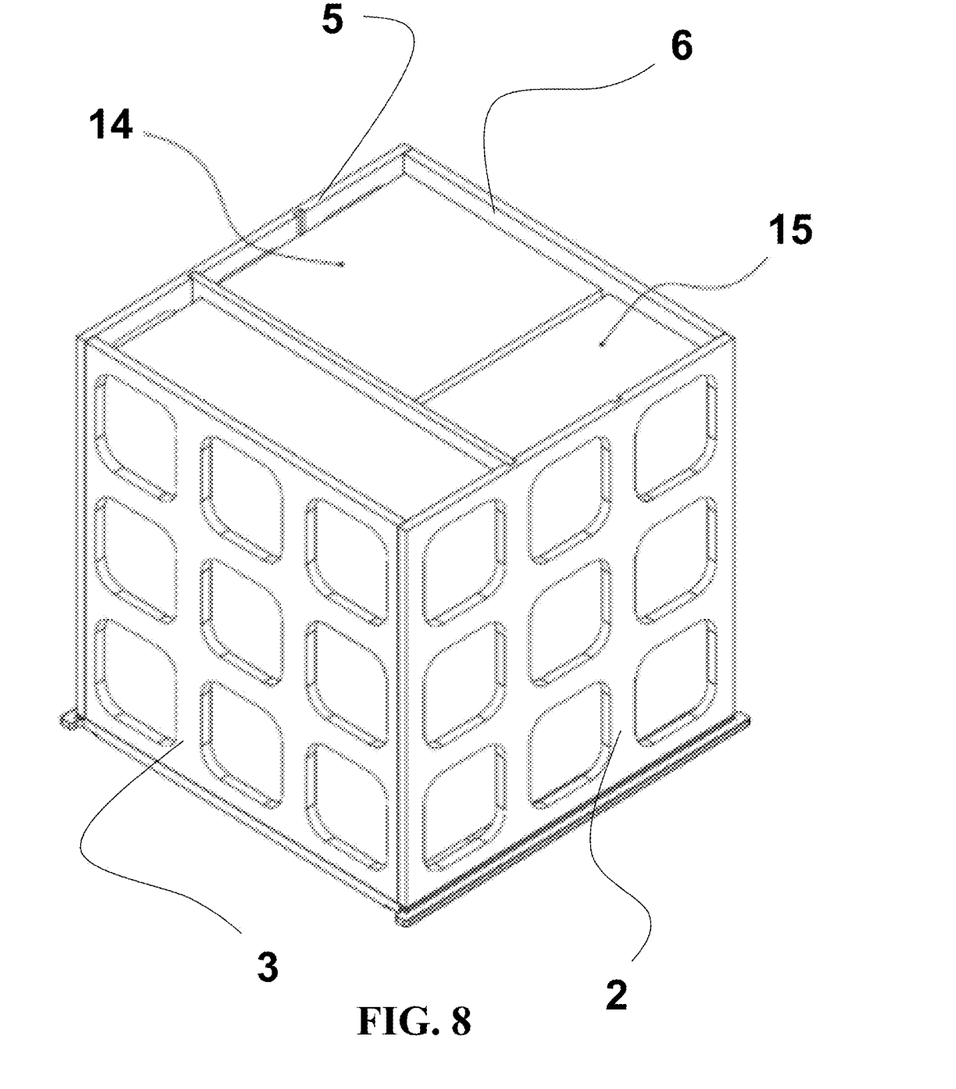
FIG. 8 depicts the large-scale CubeSat chassis with the top structural plate removed to show two internal partitions and three notional subsystems filling the internal volume.

FIG. 8 depicts the large-scale CubeSat Chassis with the top structural plate removed to show two internal partitions and a 2U×2U×3U notional subsystem (14), a 1U×2U×3U notional subsystem (15), and a 1U×3U×3U notional subsystem filling the internal volume.

Large-Scale CubeSat Chassis

In this paragraph, Applicants disclose a large-scale CubeSat chassis having an exterior surface, an interior surface, and an interior with an internal volume of from about 12 liters to about 64 liters comprising a plurality of walls, said walls having outer surfaces defining portions of the exterior surface of said chassis and inner surfaces defining portions of the interior surface of said chassis, at least some of said walls each have at least two spaced apart apertures therethrough wherein a solid portion of the wall lies between said apertures; and a structural support system, said structural support system comprising at least one of the following structures: 1) interior trusses, said interior trusses contacting said interior surface in at least ten contact locations; and 2) plate partitions, said plate partitions contacting said interior surface at three or four contact locations, wherein said contact locations are at solid portions of said walls between said apertures, and wherein said contact locations comprise pairs of contact locations wherein each contact location has an opposing contact location on an opposite portion of the interior surface.

Applicants disclose a large-scale CubeSat chassis according to the previous paragraph wherein said exterior surface has a rectangular prism configuration.

Applicants disclose a large-scale CubeSat chassis according to the previous three paragraphs wherein said exterior surface has a cubic prism configuration.

Applicants disclose a large-scale CubeSat chassis according to the previous paragraphs said CubeSat chassis having an internal volume of from about 27 liters.

Applicants disclose a large-scale CubeSat chassis according to the previous four paragraphs wherein the walls each have nine spaced apart apertures therethrough, wherein said apertures are in the configuration of squares with rounded corners, and said apertures are arranged in a three row and three column grid, wherein, said rows define a first level, a second level, and a third level, between said top and bottom walls, wherein the second level is between said first and third levels, and said structural support system comprises a plurality of interior trusses, said interior trusses comprising: a first set of interior trusses located within said first level, wherein said first set of interior trusses comprises four trusses comprising: a first truss, a second truss, a third truss, and a fourth truss, wherein said first and second trusses are spaced apart and located between said columns of apertures and said first and second trusses are oriented parallel to each other and extend in a first direction between said front and back walls, and said third and fourth trusses are spaced apart and located between said columns of apertures and are oriented parallel to each other in a second direction between said side walls, wherein said first direction is perpendicular to said second direction, wherein each truss in said first set of trusses is comprised of a plurality of members that include horizontal, vertical, and diagonal members; and a second set of interior trusses located within said third level, wherein said second set of interior trusses comprises four trusses comprising: a fifth truss, a sixth truss, a seventh truss, and an eighth truss, wherein said fifth and sixth trusses are spaced apart and located between said columns of apertures and said fifth and sixth trusses are oriented parallel to each other and extend in said first direction between said front and back walls, and said seventh and eighth trusses are spaced apart and located between said columns of apertures and are oriented parallel to each other in said second direction between said side walls, wherein each truss in said second set of trusses is comprised of a plurality of members that include horizontal, vertical, and diagonal members.

Applicants disclose a large-scale CubeSat chassis according to the previous five paragraphs wherein the vertical members of the trusses in the first set of trusses contact the top wall at top wall contact locations, and the vertical members of the trusses in the second set of trusses contact the bottom wall at bottom wall contact locations.

Applicants disclose a large-scale CubeSat chassis according to the previous paragraph further comprising a first reinforcing component that is joined to the first, second, third, and fourth trusses, and a second reinforcing component that is joined to the fifth, sixth, seventh, and eighth trusses.

Applicants disclose a large-scale CubeSat chassis according to the first four paragraphs of this specification's section titled "Large-Scale CubeSat Chassis" wherein said plurality of walls comprise opposing top and bottom walls, opposing front and back walls, and opposing side walls, wherein: the walls each have nine spaced apart apertures therethrough, wherein said apertures are in the configuration of squares with rounded corners, and said apertures are arranged in a three row and three column grid, wherein, said rows define a first level, a second level, and a third level, between said top and bottom walls, wherein the second level is between said first and third levels, and said structural support system comprises two plate partitions, wherein said side walls each have a pair of vertical grooves formed on their inside surfaces, wherein said grooves are located between said columns of apertures, wherein said plate partitions have a width that is greater than the distance between the inside surfaces of the side walls, and the plate partitions are inserted into said grooves to divide the interior of the CubeSat chassis into three compartments.

Applicants disclose a CubeSat comprising a chassis according to any of the previous eight paragraphs.

Applicants disclose a CubeSat according to the previous paragraph comprising comprising an electrical power subsystem; a command and data handling subsystem; a telemetry, tracking, and command subsystem; a thermal control subsystem; an attitude determination and control subsystem; a structures and mechanisms subsystem and/or a payload.

Applicants disclose a CubeSat according to the previous paragraph comprising a guidance, navigation, and control subsystem, and/or a propulsion subsystem. Detail concerning the subsystems of this paragraph and the preceding paragraph is as follows: Electrical Power Subsystem (EPS): Electrical power generation maybe via solar arrays, batteries, and wiring harness. Command and Data Handling (C&DH) Subsystem: This subsystem comprises a computing and processor system that receives, validates, decodes, and distributes uplink commands to the payload and subsystems. It also gathers, processes, and formats payload and bus telemetry data for downlink and/or use by the spacecraft computer. Telemetry, Tracking, and Command (TT&C) Subsystem: This subsystem provides the communications interface between the spacecraft and ground station(s). Consists of telemetry processors, signals modulators, and antennas. Thermal Control Subsystem (TCS): This subsystem maintains necessary thermal environment for payload(s) and spacecraft bus via active and/or passive means. The decision for active and/or passive thermal control is a function of spacecraft mission, payload, available power, available mass margin, available volume, and operating orbit. Attitude Determination and Control Subsystem (ADCS): This subsystem stabilizes the spacecraft and orients it in desired directions to fulfill mission objectives despite the action of external or internal disturbance torques. For a CubeSat, attitude actuators could be reaction wheels, control moment gyros, and/or magnetic torque rods. For external attitude sensors, the CubeSat could use a star tracker and/or horizon sensor. Guidance, Navigation, and Control (GNC) Subsystem: This subsystem provides orbit maintenance and stationkeeping. This function can be on-board the spacecraft or provided via the ground station. Propulsion Subsystem: This subsystem provides propulsive energy for orbit maintenance, changes in mission orbit, and/or attitude control. Many CubeSats do not feature propulsion, but it becomes a realistic option for larger vehicles and is necessary for some missions. Structures and Mechanisms Subsystem: The structure is described in this application. As for mechanisms, some missions may require deployable components and other moveable mechanical devices—these constitute the mechanisms. As with propulsion, the prevalence of mechanisms is a function of CubeSat size and mission needs. Payload(s): The payloads are project-specific and may be multiple based on power, mass, and volume margins, as well as complexity and goals of overall spacecraft development effort.

Applicants disclose a spacecraft delivery vehicle comprising a dispenser said dispenser containing a CubeSat according to the previous two paragraphs, preferably said spacecraft delivery vehicle comprises a rocket engine. The CubeSat can be delivered via a canister wherein the CubeSat is stowed within a box with a lid, then the CubeSat is ejected via spring mechanism. Alternatively, the CubeSat can be delivered via an adapter method wherein the CubeSat is connected via adapter ring. The canister and adapter can be placed on the space launch vehicle (SLV) upper stage or another, larger satellite. CubeSats can be injected into orbit from an SLV as previously stated, with said SLV comprising at least 2 stages to reach orbit. Multiple rocket engines are used per stage and each SLV stage is designed differently between manufacturers. CubeSats can also be injected into orbit from the International Space Station (ISS) via canister. With this option, the CubeSat is transported to the ISS via SLV, then placed into the canister by the ISS crew.

Suitable materials for making the aforementioned large-scale CubeSat chassis are non-outgassing material suitable for spacecraft structural purposes such as aluminum, stainless-steel, steel, brass, polyetherimide, polyether ether ketone, polyoxymethylene, reinforced carbon fibers, reinforced fiberglass, ceramic, glass, and any non-outgassing material suitable for spacecraft structural purposes.

EXAMPLES

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Example 1. A team of engineers is designing a 27 U CubeSat which will host a small telescope and propulsion subsystem. The remote sensing and maneuverability which the team requires cannot be met with smaller CubeSat chassis designs and the engineers are proposing the use of a larger CubeSat, specifically a 27 U. This larger chassis would give more internal volume and external surface area than a 6 U or 12 U alternative chassis layout. The team decides to use the 27 U and equipped the system with a single, centrally-mounted small telescope with surrounding internal volume dedicated to bus subsystems and propellant for the propulsion subsystem, similar to the layout seen in FIG. 5.

Example 2. A small satellite platform is being designed to host 10 instruments which will collect large amounts of data about the Moon and the environment of cislunar space. Due to the problem which the satellite platform is designed to solve, all 10 instruments must collect their required data. No satellite platform on the market will accommodate the configuration which the 10 instruments require. Instead, the engineers designing the satellite platform choose a 27 U CubeSat chassis to contain the instruments. The larger internal volume afforded by the 27 U chassis, compared with 6 U or 12 U alternative chassis layouts, will contain all of the instruments, as well as all necessary bus subsystems.

Example 3. A team of satellite designers are developing a CubeSat for observation of resident space objects to support space traffic management and space situational awareness in cislunar space. The satellite will be initially placed into a halo orbit about the Earth-Moon L1 Lagrange point, then transfer to the Earth-Moon L2 Lagrange point via manifold transfer near the Moon. The team wants to maximize the number of transfers between the Earth-Moon L1 and L2 Lagrange points, which will require the use of propellant by the satellite's propulsion subsystem. To do this, the team develops a 27 U chassis which uses a partitioned internal volume, similar to FIG. 7 or FIG. 8, to hold the propellant and remote sensing payload for the mission. The internal volume of the 27 U chassis enables execution of the mission intended by the team in terms of both observing resident space objects and conducting multiple transfers between the Earth-Moon L1 and L2 Lagrange points.

Example 4. A 27 U satellite is being developed for Earth observation that will contain non-cube subsystem and payload volumes based on specialized component designs. The team uses an internal truss structure, seen in FIG. 3, to create the necessary internal structural strength while enabling the placement of non-cube subsystem and payload volumes for the desired mission.

Example 5. A 27 U satellite is being developed for lunar observation that will contain two internal volume partitions and three 1 U×3 U×3 U subsystem assemblies designed and built by a subcontractor, similar to FIG. 7. However, a stakeholder-driven change in requirements causes a change in several payloads, thereby necessitating a change to the internal volume to hold the new subsystems and payloads. The team uses the modular internal design of the large-scale CubeSat chassis to change the internal volume layout, with the new layout consisting of two internal partitions and a 2 U×2 U×3 U subsystem, a 1 U×2 U×3 U subsystem, and a 1 U×3 U×3 U subsystem assembly designed and built by a different subcontractor, similar to FIG. 8.

Example 6. A 27 U satellite is being developed for Earth observation that will contain custom sensitive payload. Due to program security measures, the payload and required bus subsystems enabling both bus and payload functionality, are designed and built as a single, 27 U (or, 27-liter) cube. The team uses the large-scale CubeSat chassis and removes all internal partitions and structures, thereby leaving an empty 27 U (or, 27-liter) volume for placement of the fully-enclosed and custom 27 U (or, 27-liter) payload/bus subsystem component, similar to FIG. 4.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A CubeSat chassis having an exterior surface, an interior surface, and an interior with an internal volume of from about 12 liters to about 64 liters comprising:
    a) a plurality of walls, said walls having outer surfaces defining portions of the exterior surface of said chassis and inner surfaces defining portions of the interior surface of said chassis, at least some of said walls each have at least two spaced apart apertures therethrough wherein a solid portion of the wall lies between said apertures; and
    b) a structural support system, said structural support system comprising at least one of the following structures:
        1) Interior trusses, said interior trusses contacting said interior surface in at least ten contact locations; and
        2) Plate partitions, said plate partitions contacting said interior surface at three or four contact locations,
    wherein said contact locations are at said solid portions of said walls between said apertures, and wherein said contact locations comprise pairs of contact locations wherein each of said contact locations has an opposing one of said contact locations on an opposite portion of the interior surface;
    wherein said plurality of walls comprise opposing top and bottom walls, opposing front and back walls, and opposing side walls;
    wherein the walls each have nine spaced apart apertures therethrough, wherein said apertures are in the configuration of squares with rounded corners, and said apertures are arranged in a three row and three column grid, wherein, said rows define a first level, a second level, and a third level, between said top and bottom walls, wherein the second level is between said first and third levels;
    wherein said interior trusses of said structural support system comprise:
        a first set of interior trusses located within said first level, wherein said first set of interior trusses comprises four trusses comprising: a first truss, a second truss, a third truss, and a fourth truss, wherein said first and second trusses are spaced apart and located between said columns of apertures and said first and second trusses are oriented parallel to each other and extend in a first direction between said front and back walls, and said third and fourth trusses are spaced apart and located between said columns of apertures and are oriented parallel to each other in a second direction between said side walls, wherein said first direction is perpendicular to said second direction, wherein each truss in said first set of trusses is comprised of a plurality of members that include horizontal, vertical, and diagonal members; and a second set of interior trusses located within said third level, wherein said second set of interior trusses comprises four trusses comprising: a fifth truss, a sixth truss, a seventh truss, and an eighth truss, wherein said fifth and sixth trusses are spaced apart and located between said columns of apertures and said fifth and sixth trusses are oriented parallel to each other and extend in said first direction between said front and back walls, and said seventh and eighth trusses are spaced apart and located between said columns of apertures and are oriented parallel to each other in said second direction between said side walls, wherein each truss in said second set of trusses is comprised of a plurality of members that include horizontal, vertical, and diagonal members.

2. The CubeSat chassis of claim 1, wherein said exterior surface has a rectangular prism configuration.

3. The CubeSat chassis of claim 2, wherein said exterior surface has a cubic prism configuration.

4. The CubeSat chassis of claim 1, wherein said CubeSat chassis has an internal volume of at least about 27 liters and said exterior surface has a cubic prism geometry.

5. The CubeSat chassis of claim 1, wherein the vertical members of the trusses in the first set of trusses contact the top wall at respective ones of said contact locations on the top wall, and the vertical members of the trusses in the second set of trusses contact the bottom wall at respective ones of said contact locations on the bottom wall.

6. The CubeSat chassis of claim 1, further comprising a first reinforcing component that is joined to the first, second, third, and fourth trusses, and a second reinforcing component that is joined to the fifth, sixth, seventh, and eighth trusses.

7. A CubeSat comprising a chassis according to claim 1.

8. The CubeSat of claim 7, further comprising an electrical power subsystem; a command and data handling subsystem; a telemetry, tracking, and command subsystem; a thermal control subsystem; an attitude determination and control subsystem; a structures and mechanisms subsystem and/or a payload.

9. The CubeSat of claim 8, further comprising a guidance, navigation, and control subsystem, and/or a propulsion subsystem.

10. A spacecraft delivery vehicle comprising a dispenser, said dispenser containing a CubeSat according to claim 9.

11. The spacecraft delivery vehicle of claim 10, said spacecraft delivery vehicle comprising a rocket engine.

12. A spacecraft delivery vehicle comprising a dispenser, said dispenser containing a CubeSat according to claim 8.

13. The spacecraft delivery vehicle of claim 12, said spacecraft delivery vehicle comprising a rocket engine.

14. A CubeSat chassis having an exterior surface, an interior surface, and an interior with an internal volume of from about 12 liters to about 64 liters comprising:

a) a plurality of walls, said walls having outer surfaces defining portions of the exterior surface of said chassis and inner surfaces defining portions of the interior surface of said chassis, at least some of said walls each have at least two spaced apart apertures therethrough wherein a solid portion of the wall lies between said apertures; and b) a structural support system, said structural support system comprising at least one of the following structures:

1) Interior trusses, said interior trusses contacting said interior surface in at least ten contact locations; and 2) Plate partitions, said plate partitions contacting said interior surface at three or four contact locations, wherein said contact locations are at said solid portions of said walls between said apertures, and wherein said contact locations comprise pairs of contact locations wherein each of said contact locations has an opposing one of said contact locations on an opposite portion of the interior surface;

wherein said plurality of walls comprise opposing top and bottom walls, opposing front and back walls, and opposing side walls;

wherein the walls each have nine spaced apart apertures therethrough, wherein said apertures are in the configuration of squares with rounded corners, and said apertures are arranged in a three row and three column grid, wherein, said rows define a first level, a second level, and a third level, between said top and bottom walls, wherein the second level is between said first and third levels, and wherein said structural support system comprises two of said plate partitions, wherein said side walls each have a pair of vertical grooves formed on their inside surfaces, wherein said grooves are located between said columns of apertures, wherein said plate partitions have a width that is greater than the distance between the inside surfaces of the side walls, and the plate partitions are inserted into said grooves to divide the interior of the CubeSat chassis into three compartments.

* * * * *